Figure 1:
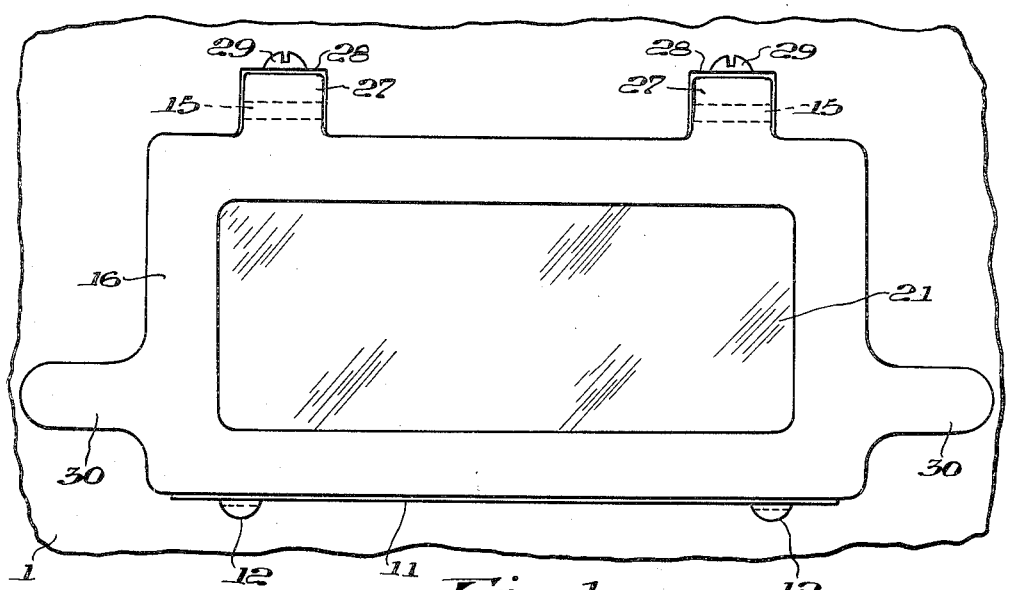

March 25, 1952     R. B. EVANS     2,590,526
LIFT FRONT LENS HOLDER

Filed July 29, 1950     2 SHEETS—SHEET 1

INVENTOR.
ROBERT B. EVANS.
BY Brown, Critchlow,
Flick & Peckham
his ATTORNEYS.

March 25, 1952  R. B. EVANS  2,590,526
LIFT FRONT LENS HOLDER

Filed July 29, 1950  2 SHEETS—SHEET 2

INVENTOR.
ROBERT B. EVANS.
BY
Brown, Critchlow, Flick & Peckham
his
ATTORNEYS.

Patented Mar. 25, 1952

2,590,526

UNITED STATES PATENT OFFICE 2,590,526

LIFT FRONT LENS HOLDER

Robert B. Evans, Natrona, Pa., assignor to Mine Safety Appliances Company, Pittsburgh, Pa., a corporation of Pennsylvania Application July 29, 1950, Serial No. 176,664

4 Claims. (Cl. 2—8)

This invention relates to lift front lens holders, such as are used on welding masks.

A face protecting mask is on the market for use principally by sand blasters. The mask has a rectangular opening in front of the eyes, the opening being closed by a glass surrounded by a frame integral with the mask. The glass may be protected by a screen to keep the abrasive from pitting it.

It is among the objects of this invention to provide an attachment for an abrasive mask which permits a welder's dark colored glass or lens to be detachably connected to the mask. Other objects are to provide such an attachment in which the lens can be swung up out of the line of vision, in which the lens-carrying frame is held by spring pressure in its upper and lower positions, and in which the springs protect the hinge connection from the welding sputter.

In accordance with this invention a main frame is adapted to be supported by the front of a face-shielding device, such as an abrasive mask facepiece. The frame preferably is provided with a slot in its lower wall so that the frame can be slid down over the frame which surrounds the glass in the front of the facepiece. A spring plate, detachably connected to the bottom of the main frame, projects rearward and upward to press against the bottom of the facepiece frame so that the main frame will be held securely in place. The top of the main frame is provided with a stationary hinge member having a transverse horizontal opening through it. In front of this frame there is a normally vertical cover frame, provided on top with a movable hinge member having a transvere horizontal opening through it registering with the other opening. A hinge pin extends through the two openings for hinging the main frame and cover frame together. The movable hinge member has a substantially straight front side which preferably is flat and vertical. A protective glass is mounted in the cover frame. A leaf spring is secured to the stationary hinge member behind the movable hinge member and extends forward over the latter. When the cover frame is swung forward into substantially horizontal position the spring presses down on the front sides of the movable hinge member with sufficient force to hold the cover frame in its upper position. It also is desirable to have the upper side of the movable hinge member flat and disposed at right angles to the front side so that the pressure of the spring on top of the hinge member will hold the cover frame in operative position in front of the main frame. The sides of the spring may be bent down over the sides of the hinge members to hold the hinge pin in position and to protect the hinge connection from welding sputter.

Figure 2:
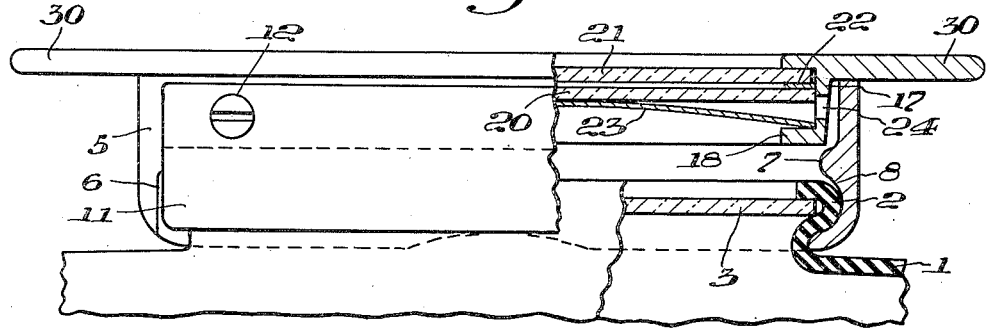
Figure 3:
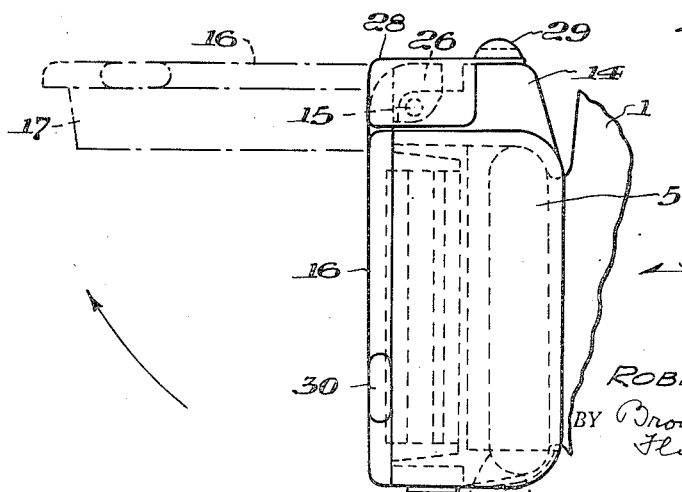
Figure 4:
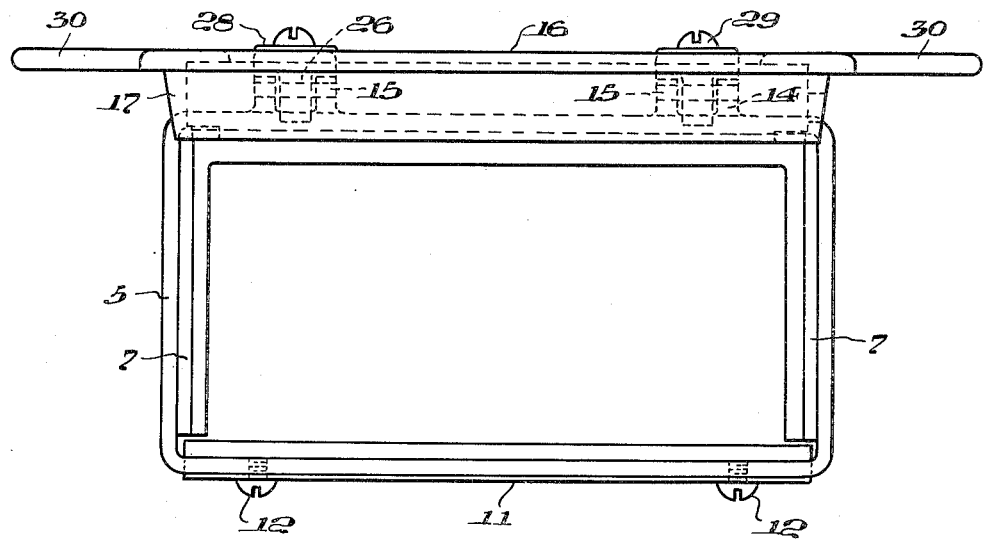
Figure 5:
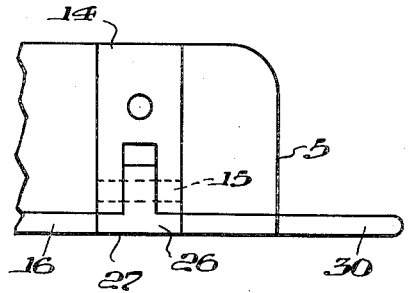

The preferred embodiment of the invention is illustrated in the accompanying drawings in which Fig. 1 is a fragmentary front view of an abrasive mask facepiece to which my lens holder has been attached; Fig. 2 is a bottom view of the lens holder attached to the facepiece and partly broken away; Fig. 3 is an end view thereof; Fig. 4 is a front view of the lens holder alone, with the cover frame raised; and Fig. 5 is a plan view of one end of the lens holder with the hinge spring removed.

Referring to the drawings, an abrasive mask facepiece 1, formed of rubber or other suitable flexible material, is provided in front of the eyes with a rectangular opening surrounded by a grooved frame 2 integral with the facepiece. A flat glass 3 is set in the frame to seal the opening. When it is desired to use this mask for welding, a lens holder is attached to the facepiece frame. According to this invention the lens holder includes a main rectangular frame 5 which has the rear edges of its top and end walls turned inward. As shown in Fig. 2, the rear half of the bottom wall is cut away to form a slot 6 as long as the facepiece frame and wide enough to permit the main frame to be slid down over the facepiece frame until the top of the latter engages the top wall of the main frame. The inside of the end walls of the main frame are provided with vertical ribs 7 to form grooves 8 that receive the ends of the facepiece frame. After the main frame has been slipped over the facepiece frame in this manner, a rectangular spring plate 11 is attached to the bottom wall of the main frame by a pair of screws 12. The plate extends back across slot 6 in the bottom wall and is sprung upward so that it presses tightly against the bottom of the facepiece frame. This holds the two frames tightly together.

The top of main frame 5 is provided with a pair of stationary hinge members 14, each of which has a solid rear portion and a bifurcated front portion provided with horizontal transverse openings for receiving a hinge pin 15. The top of the bifurcated portion is lower than the top of the rear portion. Normally engaging the front of the main frame there is a cover frame 16, the rear side of which is provided with a rearwardly projecting wall 17 which is surrounded by an inturned flange 18. Between the flange and the front of the cover frame there is a colored welding glass 20 that is protected by a cover glass 21 separated from it by a gasket 22. The two glasses are pressed forward against the front of the frame by a bowed rectangular spring 23. These four elements can be inserted in the frame or removed from it by sliding them through a slot 24 in one end of wall 17 of the cover frame.

To permit the cover frame to be swung upward into a substantially horizontal position out of the line of vision, as shown in Fig. 4 and in broken lines in Fig. 3, the top of the cover frame is provided with a pair of integral hinge members 26 which are movable with it. Each of these hinge members has a narrow rear portion that extends into the bifurcated portion of the associated stationary hinge member 14 where it is held by hinge pin 15. The front portion of each movable hinge member is wider than its rear portion and has a flat front face 27 in the plane of the front surface of the cover frame. The upper front edge of the movable hinge member may be rounded transversely of its length. The upper surface of the movable hinge member preferably is flat and disposed at right angles to front face 27.

When the cover frame is in operative position against the front of the main frame, it is held there by a leaf spring 28 that is attached to the top of the stationary hinge member's rear portion by a screw 29. The spring extends straight across the top of the movable hinge member and presses down on it with sufficient force to hold the cover frame against the main frame unless the former is lifted by one of the lugs 30 projecting from its ends. When the cover frame is lifted and swung up to horizontal position, it is held in that position by the pressure of the leaf springs on top of the flat front sides 27 of the movable hinge members. Each spring has downwardly turned parallel side portions that extend across the ends of the adjoining hinge pin 15 to hold it in place. These sides, as well as the overlying portions of the springs, also help protect the hinges from fouling by molten metal sputtering off the weld.

Whenever it is desired to remove the lens holder from the facepiece, all that has to be done is to remove screws 12 that hold the bottom spring plate 11, and then slide the main frame 5 up and off the facepiece frame 2.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A lift front lens holder comprising a main frame adapted to be supported by the front of a face-shielding device and provided on top with a stationary hinge member having a transverse horizontal opening through it, a normally vertical cover frame in front of the main frame and provided on top with a movable hinge member having a transverse horizontal opening through it registering with said first-mentioned opening, said movable hinge member having a substantially straight front side, a hinge pin extending through said openings for hinging said frames together, a protective glass mounted in the cover frame, and a leaf spring secured to said stationary hinge member behind the movable hinge member and extending forward over the latter, said spring being positioned to press down on said front side of the movable hinge member with sufficient force when the cover frame is swung upward into substantially horizontal position to hold the cover frame in that position, and the spring having side portions extending downward across the ends of the hinge pin to hold the pin in place.

2. A lift front lens holder comprising a rectangular main frame having integral inturned flanges along the rear edges of its top and end walls, the rear edge of the frame's bottom wall being located a considerable distance in front of the rear of the frame to form a slot that permits the frame to be slipped down over the rectangular lens frame of an abrasive mask facepiece, a plate detachably connected to the bottom of the main frame and projecting across said slot to hold the main frame on said facepiece frame, the top of the main frame being provided with a stationary hinge member having a transverse horizontal opening through it, a normally vertical cover frame in front of the main frame and provided on top with a movable hinge member having a transverse horizontal opening through it registering with said first-mentioned opening, said movable hinge member having a substantially straight front side, a hinge pin extending through said openings for hinging said frames together, a protective glass mounted in the cover frame and a leaf spring secured to said stationary hinge member behind the movable hinge member and extending forward over the latter, said spring being positioned to press down on said front side of the movable hinge member with sufficient force when the cover frame is swung upward into substantially horizontal position to hold the cover frame in that position.

3. A lift front lens holder comprising a rectangular main frame having integral inturned flanges along the rear edges of its top and end walls, the rear edge of the frame's bottom wall being located a considerable distance in front of the rear of the frame to form a slot that permits the frame to be slipped down over the rectangular lens frame of an abrasive mask facepiece, the inside of said end walls having vertical ribs spaced from the end wall flanges to engage the front of said facepiece frame, a plate detachably connected to the bottom of the main frame and projecting across said slot to hold the main frame on said facepiece frame, the top of the main frame being provided with a stationary hinge member having a transverse horizontal opening through it, a normally vertical cover frame in front of the main frame and provided on top with a movable hinge member having a transverse horizontal opening through it registering with said first-mentioned opening, said movable hinge member having a substantially straight front side, a hinge pin extending through said openings for hinging said frames together, a protective glass mounted in the cover frame, and a leaf spring secured to said stationary hinge member behind the movable hinge member and extending forward over the latter, said spring being positioned to press down on said front side of the movable hinge member with sufficient force when the cover frame is swung forward into substantially horizontal position to hold the cover frame in that position.

4. A lift front lens holder comprising a rectangular main frame having integral inturned flanges along the rear edges of its top and end walls, the rear edge of the frame's bottom wall being located a considerable distance in front of the rear of the frame to form a slot that permits the frame to be slipped down over the rectangular lens frame of an abrasive mask facepiece, a spring plate detachably connected to the bottom of the main frame and projecting rearward and upward across said slot to press up against the bottom of said facepiece frame, the top of the main frame being provided with a stationary hinge member having a transverse horizontal opening through it, a normally vertical cover frame in front of the main frame and provided on top with a movable hinge member having a transverse horizontal opening through it registering with said first-mentioned opening, said movable hinge member having a substantially straight front side, a hinge pin extending through said openings for hinging said frames together, a protective glass mounted in the cover frame, and a leaf spring secured to said stationary hinge member behind the movable hinge member and extending forward over the latter, said spring being positioned to press down on said front side of the movable hinge member with sufficient force when the cover frame is swung upward to substantially horizontal position to hold the cover frame in that position.

ROBERT B. EVANS.

REFERENCES CITED

The following references are of record in the file of this patent:

UNITED STATES PATENTS

| Number | Name | Date |
|---|---|---|
| 1,228,341 | Maynard | May 29, 1917 |
| 2,266,967 | Fuller | Dec. 23, 1941 |
| 2,270,028 | Anderson | Jan. 13, 1942 |